(12) United States Patent
Xia et al.

(10) Patent No.: US 8,749,908 B2
(45) Date of Patent: Jun. 10, 2014

(54) SYSTEMS AND METHODS FOR SYNC MARK DETECTION

(75) Inventors: Haitao Xia, San Jose, CA (US);
Shaohua Yang, San Jose, CA (US);
George Mathew, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 455 days.

(21) Appl. No.: 13/050,048

(22) Filed: Mar. 17, 2011

(65) Prior Publication Data
US 2012/0236428 A1 Sep. 20, 2012

(51) Int. Cl.
*G11B 5/09* (2006.01)
(52) U.S. Cl.
USPC ............ 360/51; 360/32; 360/39; 360/48; 360/77.02

(58) Field of Classification Search
None
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittle | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,955,783 A | 9/1999 | Ben-Efraim | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Dismery Mercedes
(74) *Attorney, Agent, or Firm* — Hamilton DeSanctis & Cha

(57) ABSTRACT

Various embodiments of the present invention provide systems and methods for data processing. As an example, a data processing circuit is disclosed that includes an equalizer circuit and a data detection circuit. The equalizer circuit is operable to filter a series of samples based at least in part on a filter coefficient and to provide a corresponding series of filtered samples. The data detection circuit includes: a core data detector circuit and a coefficient determination circuit. The core data detector circuit is operable to perform a data detection process on the series of filtered samples and to provide a most likely path and a next most likely path. The coefficient determination circuit operable to update the filter coefficient based at least in part on the most likely path and the next most likely path.

22 Claims, 7 Drawing Sheets

(56) References Cited

U.S. PATENT DOCUMENTS

| | | | |
|---|---|---|---|
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,023,386 A * | 2/2000 | Reed et al. | 360/51 |
| 6,069,583 A | 5/2000 | Silvestrin et al. | |
| 6,081,397 A | 6/2000 | Belser | |
| 6,111,712 A | 8/2000 | Vishakhadatta et al. | |
| 6,184,733 B1 * | 2/2001 | Wang et al. | 327/157 |
| 6,208,478 B1 | 3/2001 | Chiu et al. | |
| 6,269,058 B1 | 7/2001 | Yamanoi et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 * | 12/2003 | Ashley et al. | 360/51 |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 * | 11/2004 | Rae | 360/51 |
| 6,839,014 B2 | 1/2005 | Uda | |
| 6,856,183 B2 | 2/2005 | Annampedu | |
| 6,856,480 B2 * | 2/2005 | Kuki et al. | 360/49 |
| 6,876,511 B2 | 4/2005 | Koyanagi | |
| 6,912,099 B2 | 6/2005 | Annampedu et al. | |
| 6,961,397 B2 * | 11/2005 | Ahmed et al. | 375/354 |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 * | 2/2007 | Annampedu et al. | 360/46 |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,286,313 B2 | 10/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,403,351 B1 * | 7/2008 | Han et al. | 360/46 |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,525,460 B1 | 4/2009 | Liu et al. | |
| 7,529,320 B2 | 5/2009 | Byrne et al. | |
| 7,558,177 B2 | 7/2009 | Ogura et al. | |
| 7,583,459 B1 * | 9/2009 | Cheng | 360/45 |
| 7,602,568 B1 | 10/2009 | Katchmart | |
| 7,616,395 B2 | 11/2009 | Yamamoto | |
| 7,620,101 B1 | 11/2009 | Jenkins | |
| 7,630,155 B2 | 12/2009 | Maruyama et al. | |
| 7,733,590 B2 * | 6/2010 | Motwani | 360/51 |
| 7,881,164 B1 * | 2/2011 | Han et al. | 369/44.11 |
| 7,974,034 B1 * | 7/2011 | Han et al. | 360/51 |
| 8,049,983 B1 * | 11/2011 | Han et al. | 360/51 |
| 8,174,949 B2 * | 5/2012 | Ratnakar Aravind | 369/59.19 |
| 8,243,381 B2 * | 8/2012 | Annampedu et al. | 360/51 |
| 8,345,369 B2 * | 1/2013 | Xia et al. | 360/51 |
| 8,379,498 B2 * | 2/2013 | Mathew et al. | 369/47.28 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0090971 A1 | 5/2003 | Gushima et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang et al. | |
| 2005/0243455 A1 | 11/2005 | Annampedu | |
| 2005/0243959 A1 * | 11/2005 | Ashley et al. | 375/364 |
| 2006/0280093 A1 * | 12/2006 | Nagai et al. | 369/59.22 |
| 2007/0064847 A1 | 3/2007 | Gaedke | |
| 2007/0071152 A1 | 3/2007 | Chen et al. | |
| 2007/0103805 A1 | 5/2007 | Hayashi | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2007/0280059 A1 | 12/2007 | Cheng et al. | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |
| 2010/0118426 A1 * | 5/2010 | Vikramaditya et al. | 360/51 |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/973,904, filed Dec. 20, 2010, Viswanath Annampedu.
U.S. Appl. No. 13/100,021, filed May 3, 2011, Xia, Haitao et. al.
U.S. Appl. No. 13/113,210, filed May 23, 2011, Zhang, Xun et. al.
U.S. Appl. No. 13/014,754, filed Jan. 27, 2011, Viswanath Annampedu.
U.S. Appl. No. 13/009,067, filed Jan. 19, 2011, Zhang, Xun et.al.
U.S. Appl. No. 13/050,048, filed Mar. 17, 2011, Xia, Haitao et.al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, filed Sep. 23, 2011, Grundvig, Jeffery P.
Annampedu, V. et al., "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE International May 2006.

(56) References Cited

OTHER PUBLICATIONS

Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.

Kryder, M. et al "Heat Assisted Magnetic Recording" Proc. IEEE, vol. 96, No. 11, p. 1810, Nov. 2008.
Weller et al "Thermal Limits in Ultrahigh-density Magnetic Recording" IEEE Trans. Magn. vol. 35, No. 6, p. 4423, Nov. 1999.

\* cited by examiner

SYSTEMS AND METHODS FOR SYNC MARK DETECTION

BACKGROUND OF THE INVENTION

The present inventions are related to systems and methods for data processing, and more particularly to systems and methods for data detection.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by an ability to recover the originally provided data. Such recovery often involves detection of a sync-mark that indicates a location and timing of user data to be recovered. In some cases, the sync mark cannot be properly recovered resulting in data losses.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for data detection.

Various embodiments of the present invention provide data processing circuits that include a first comparison circuit, a second comparison circuit, and a comparator circuit. The first comparison circuit is operable to compare a first set of digital samples derived from an analog input with a first sync pattern to yield a first comparison value corresponding to a first phase. The second comparison circuit is operable to compare a second set of digital samples derived from the analog input with a second sync pattern to yield a second comparison value corresponding to a second phase. The comparator circuit is operable to identify the first comparison value as less than the second comparison value, and to provide the first phase as a phase correction output.

In some instances of the aforementioned embodiments, the first set of digital samples and the second set of digital samples are the same digital samples, and the first sync pattern corresponds to an expected sync pattern at the first phase and the second sync pattern corresponds to an expected sync pattern at the second phase. In some such instances, the circuit further includes an analog to digital converter circuit operable to sample the analog input synchronous to a sampling clock; and a phase correction circuit operable to adjust the sampling clock based at least in part on the phase correction output. In particular cases, the circuit further includes an equalizer circuit operable to equalize the same digital samples to yield an equalized data set; and a data processing circuit operable to process the equalized data set. In various cases, the first comparison circuit is a first Euclidean distance calculation circuit operable to calculate the first comparison value as the Euclidean distance between the same digital samples and the expected sync pattern at the first phase, and the second comparison circuit is a second Euclidean distance calculation circuit operable to calculate the second comparison value as the Euclidean distance between the same digital samples and the expected sync pattern at the second phase.

In one or more cases, the circuit further includes an ideal sync pattern look up table operable to provide the expected sync pattern at the first phase and the expected sync pattern at the second phase based at least in part on a channel bit density. In such cases, the circuit may include an analog front end circuit operable to filter a continuous signal to yield the analog input, wherein the analog front end circuit exhibits a corner frequency. In such cases, the ideal sync pattern lookup table is further operable to provide the expected sync pattern at the first phase and the expected sync pattern at the second phase is based at least in part on the corner frequency. In various cases, the circuit further includes an analog front end circuit operable to amplify a continuous signal to yield the analog input. In such cases, the analog front end circuit exhibits a gain, and the ideal sync pattern lookup table is further operable to provide the expected sync pattern at the first phase and the expected sync pattern at the second phase is based at least in part on the gain. In some cases, the comparator circuit is further operable to compare the first comparison value with a threshold value, and to assert a sync found signal when the first comparison value is less than the threshold value.

Other embodiments of the present invention provide methods for sync mark detection. The methods include: receiving a series of digital samples embodying a sync mark pattern; providing a first sync pattern corresponding to a first phase; providing a second sync pattern corresponding to a second phase; calculating a difference between the series of digital samples and the first sync pattern to yield a first comparison value corresponding to the first phase; calculating a difference between the series of digital samples and the second sync pattern to yield a second comparison value corresponding to the second phase; comparing the first comparison value with the second comparison value, wherein the first comparison value is less than the second comparison value; and providing the first phase as a phase correction output.

Yet other embodiments of the present invention provide data storage devices that include: a storage medium, an analog front end circuit, an analog to digital converter circuit, a first comparison circuit, a second comparison circuit, a comparator circuit, and a phase correction circuit. The storage medium maintains information, and the read/write head assembly is operable to sense the information and to provide a corresponding continuous signal. The analog front end circuit is operable to process the continuous signal to yield an analog input, and the analog to digital converter circuit is operable to sample the analog input synchronous to a sampling clock to yield a set of digital samples. The first comparison circuit is operable to compare the set of digital samples with a first sync pattern to yield a first comparison value corresponding to a first phase, and the second comparison circuit is operable to compare the set of digital samples with a second sync pattern to yield a second comparison value corresponding to a second phase. The comparator circuit is operable to identify the first comparison value as less than the second comparison value, and to provide the first phase as a phase correction output. The phase correction circuit is operable to adjust the sampling clock based at least in part on the phase correction output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for data detection.

Figure 1:
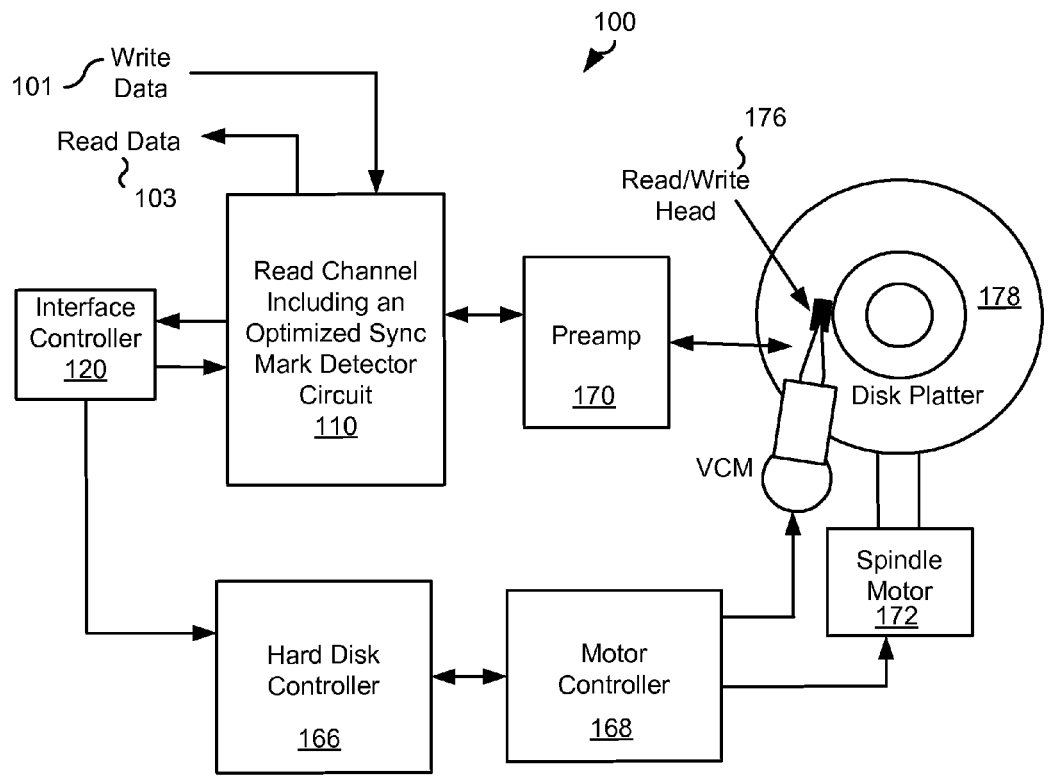
FIG. 1 shows a storage system including a read channel with an optimized sync mark detector circuit in accordance with various embodiments of the present invention.

Turning to FIG. 1, a storage system 100 including a read channel circuit 110 with an optimized sync mark detector circuit in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. As part of processing the received information, read channel circuit 110 performs an optimized sync mark detection process using an optimized sync mark detector circuit. Such an optimized sync mark detector circuit may be implemented similar to any of those described below in relation to FIGS. 3-6, and/or may operate similar to either of the methods discussed below in relation to FIGS. 7-8. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
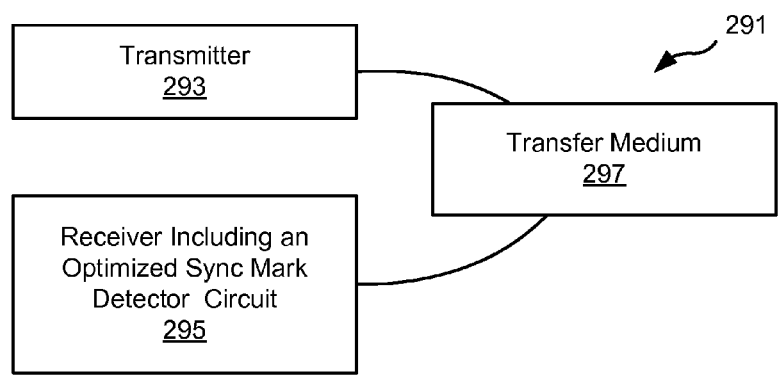
FIG. 2 depicts a data transmission system including a receiver with an optimized sync mark detector circuit in accordance with various embodiments of the present invention.

Turning to FIG. 2, a data transmission system 200 including a receiver 295 with an optimized sync mark detector circuit is shown in accordance with different embodiments of the present invention. Data transmission system 200 includes a transmitter 293 that is operable to transmit encoded information via a transfer medium 297 as is known in the art. The encoded data is received from transfer medium 297 by receiver 295. Receiver 295 incorporates an optimized sync mark detector circuit. Such an optimized sync mark detector circuit may be implemented similar to any of those described below in relation to FIGS. 3-6, and/or may operate similar to either of the methods discussed below in relation to FIGS. 7-8.

Figure 3:
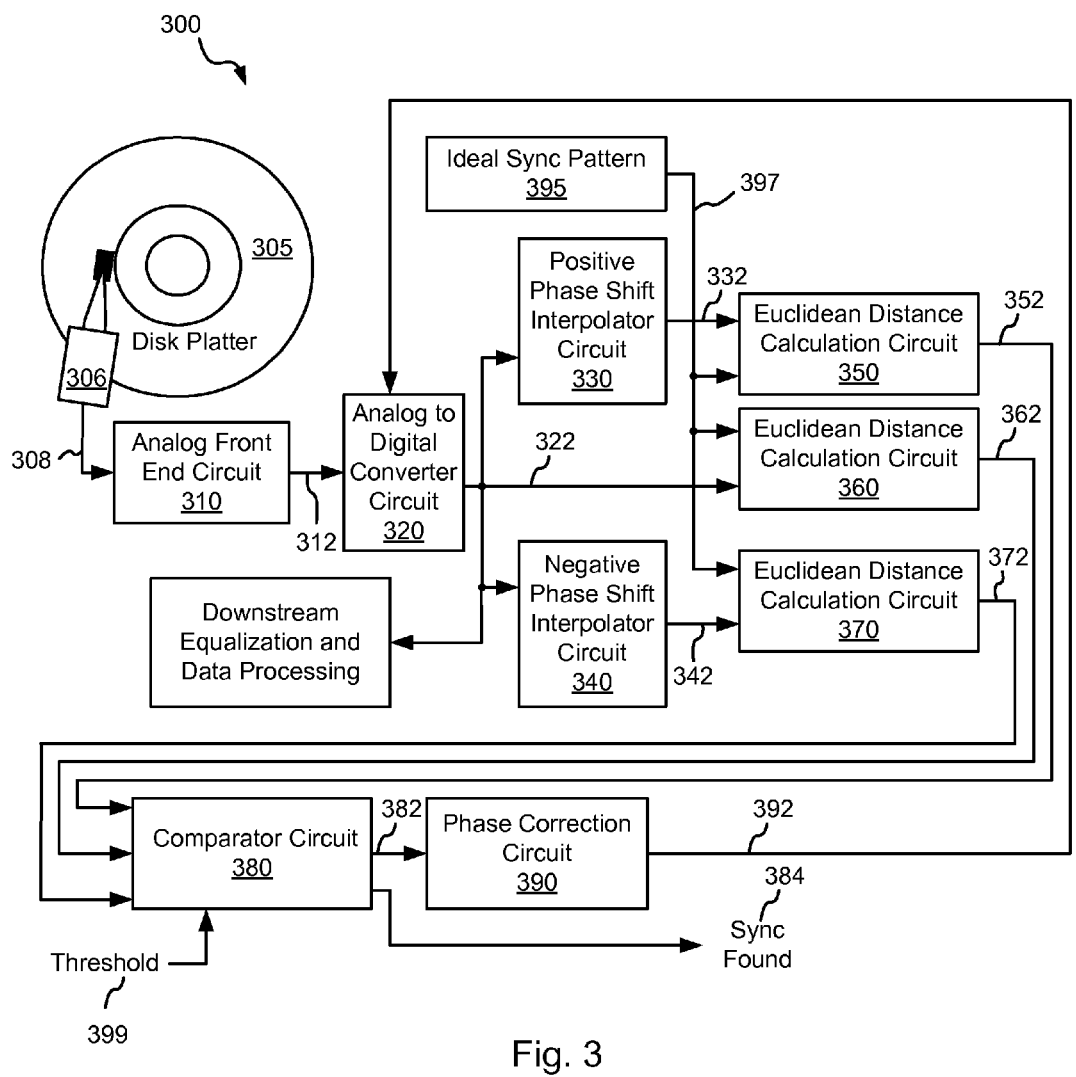
FIG. 3 shows a data processing circuit including a pre-equalizer sync mark detector circuit in accordance with one or more embodiments of the present invention.

Turning to FIG. 3, a data processing circuit 300 is shown that includes a pre-equalizer sync mark detector circuit in accordance with one or more embodiments of the present invention. Data processing circuit 300 includes an analog front end circuit 310 that receives an analog signal 308 from a read/write head assembly 306 disposed in relation to a disk platter 305. Disk platter 305 stores information that may be sensed by read/write head assembly 306. Analog front end circuit 310 processes analog signal 308 and provides a processed analog signal 312 to an analog to digital converter circuit 320. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310.

Analog to digital converter circuit 320 converts processed analog signal 312 into a corresponding series of digital samples 322. Analog to digital converter circuit 320 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In addition to being used for sync mark detection, digital samples 322 are provided to a downstream equalization and data processing circuitry. Such downstream data processing circuitry may rely on a sync found output 384.

Such downstream equalization may include, for example, equalizing the series of digital samples provided from the analog to digital conversion process to yield an equalized data set. Such equalization may be done using, for example, using a finite impulse response circuit as are known in the art. The downstream data processing may include performing data processing on the equalized data set including, for example, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

Digital samples 322 are provided to a positive phase shift interpolator circuit 330, to a Euclidean distance calculation circuit 360, and to a negative phase shift interpolator circuit 340. Positive phase shift interpolator circuit 330 interpolates between samples received from analog to digital converter circuit 320 to approximate a sample that would be expected to have been provided by analog to digital converter circuit 320 if the sampling phase was $\phi-\Delta$, where $\phi$ is the phase at which digital samples 322 are sampled and $\Delta$ is an offset. Positive phase shift interpolator circuit 330 provides the resulting interpolated output as a positive shifted output 332 to a Euclidean distance calculation circuit 350. Negative phase shift interpolator circuit 340 interpolates between samples received from analog to digital converter circuit 320 to approximate a sample that would be expected to have been provided by analog to digital converter circuit 320 if the sampling phase was $\phi-\Delta$. Again, $\phi$ is the phase at which digital samples 322 are sampled and $\Delta$ is an offset. Negative phase shift interpolator circuit 340 provides the resulting interpolated output as a negative shifted output 342 to a Euclidean distance calculation circuit 370.

Euclidean distance calculation circuit 350 calculates a Euclidean distance between an expected sync pattern 397 and positive shifted output 332 to yield a comparison value 352 in accordance with the following equation:

$$\text{Comparison Value } 352 = \sum_{i=0}^{n-1} (\text{Positive Shifted Output } 332_i - \text{Expected Sync Pattern } 397_i)^2,$$

where n is the number of bits in expected sync pattern 397. Expected sync pattern 397 is provided from an ideal sync pattern register 395 that is written with a pattern of values that correspond to an expected sync mark where a sampling clock 392 provided to the analog to digital convert circuit 320 is correct. Euclidean distance calculation circuit 360 calculates a Euclidean distance between expected sync pattern 397 and digital samples 322 to yield a comparison value 362 in accordance with the following equation:

$$\text{Comparison Value } 362 = \sum_{i=0}^{n-1} (\text{Digital Samples } 322_i - \text{Expected Sync Pattern } 397_i)^2.$$

Again, n is the number of bits in expected sync pattern 397. Euclidean distance calculation circuit 370 calculates a Euclidean distance between expected sync pattern 397 and negative shifted output 342 to yield a comparison value 372 in accordance with the following equation:

$$\text{Comparison Value } 372 = \sum_{i=0}^{n-1} (\text{Positive Shifted Output } 342_i - \text{Expected Sync Pattern } 397_i)^2.$$

Again, n is the number of bits in expected sync pattern 397.

Comparison value 352, comparison value 362 and comparison value 372 are provided to a comparator circuit 380. Comparator circuit 380 determines whether any of comparison value 352, comparison value 362 and comparison value 372 is less than a threshold value 399; and which of comparison value 352, comparison value 362 and comparison value 372 is the lowest. Where any of comparison value 352, comparison value 362 and comparison value 372 is below a threshold value 399, sync found output 384 is asserted. In some cases, threshold value 399 is programmable. Comparator circuit 380 selects the phase offset corresponding to the comparison value that was the lowest value, and provides the phase offset as a phase selection output 382 to a phase correction circuit 390. Thus, where comparison value 352 is identified as the lowest, the value of phase selection output 382 is positive $\Delta$. Where comparison value 362 is identified as the lowest, the value of phase selection output 382 is 0. Where comparison value 372 is identified as the lowest, the value of phase selection output 382 is negative $\Delta$. Phase correction circuit 390 modifies sampling clock 392 to incorporate the received phase offset and thereby correct the sampling phase of analog to digital converter circuit 320.

Of note, data samples generated prior to equalization are used for data sync detection processes. Such an approach avoids a situation where taps or coefficients of a downstream equalizer are sufficiently out of tune that a sync mark cannot be detected in the post equalization data resulting in a deadlock condition where a sync mark cannot be found and thereby the equalizer taps or coefficients cannot be trained. Based upon the disclosure provided herein, one of ordinary skill in the art will recognize a variety of other advantages that may be achieved through use of one or more embodiments of the present invention.

Figure 4:
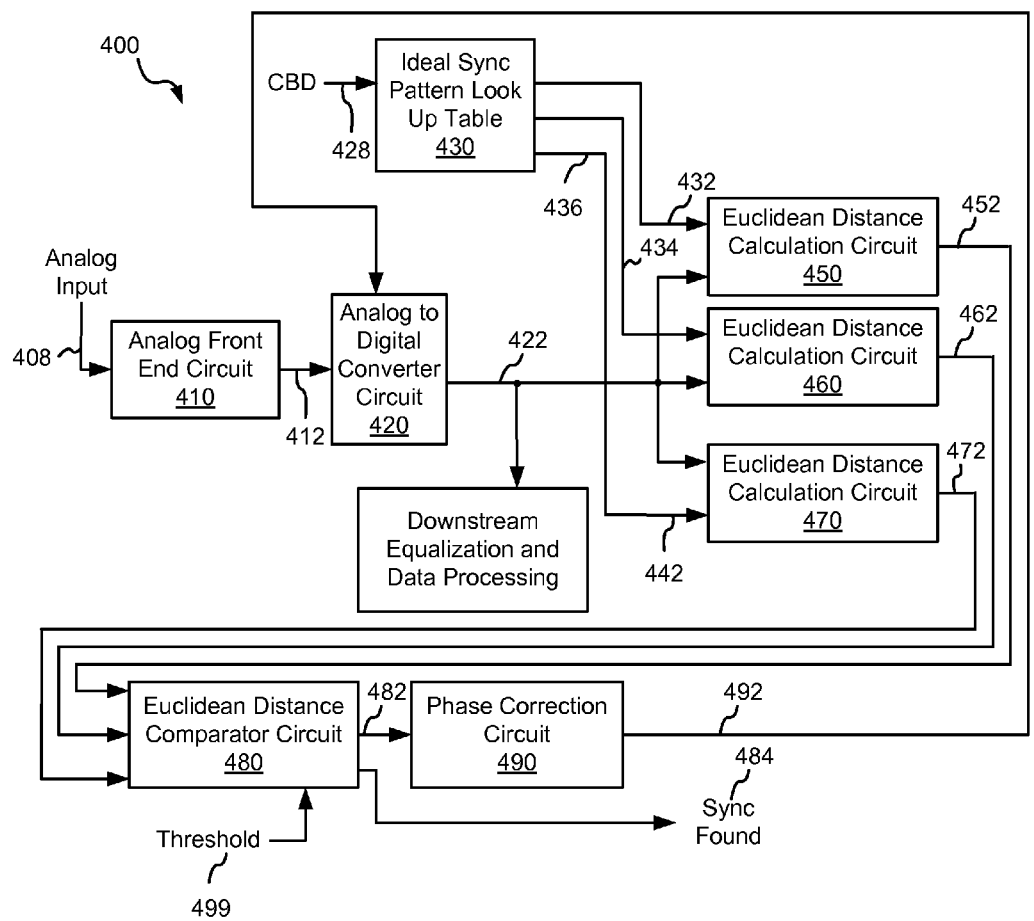
FIG. 4 depicts a data processing circuit including another pre-equalizer sync mark detector circuit in accordance with other embodiments of the present invention.

Turning to FIG. 4, a data processing circuit 400 is shown that includes another pre-equalizer sync mark detector circuit in accordance with other embodiments of the present invention. Data processing circuit 400 includes an analog front end circuit 410 that receives an analog input 408. Analog input 408 may be received, for example, from a read/write head assembly (not shown) disposed in relation to a storage medium (not shown). As another example, analog input 408 may be received from a transmission medium (not shown) via a receiver (not shown). Based upon the disclosure provided herein, one of ordinary skill in the art will recognize a variety of sources of analog input 408. Analog front end circuit 410 processes analog signal 408 and provides a processed analog signal 412 to an analog to digital converter circuit 420. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410.

Analog to digital converter circuit 420 converts processed analog signal 412 into a corresponding series of digital samples 422. Analog to digital converter circuit 420 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In addition to being used for sync mark detection, digital samples 422 are provided to a downstream equalization and data processing circuitry. Such downstream data processing circuitry may rely on a sync found output 484.

Such downstream equalization may include, for example, equalizing the series of digital samples provided from the analog to digital conversion process to yield an equalized data set. Such equalization may be done using, for example, using a finite impulse response circuit as are known in the art. The downstream data processing may include performing data processing on the equalized data set including, for example, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

Digital samples 422 are provided to a Euclidean distance calculation circuit 450, a Euclidean distance calculation circuit 460, and a Euclidean distance calculation circuit 470. Euclidean distance calculation circuit 450 calculates a Euclidean distance between an ideal pattern 432 corresponding to a positive phase shift (i.e., positive $\Delta$) and digital samples 422. The resulting distance corresponds to the following equation and is provided as a comparison output 452:

$$\text{Comparison Value } 452 = \sum_{i=0}^{n-1} (\text{Positive Shifted Sync Pattern } 432_i - \text{Digital Samples } 422_i)^2,$$

where n is the number of bits in the sync pattern at issue. Euclidean distance calculation circuit 460 calculates a Euclidean distance between an ideal pattern 434 corresponding to a zero phase shift and digital samples 422. The resulting distance corresponds to the following equation and is provided as a comparison output 452:

$$\text{Comparison Value } 462 = \sum_{i=0}^{n-1} (\text{Zero Shifted Sync Pattern } 434_i - \text{Digital Samples } 422_i)^2.$$

Again, n is the number of bits in the sync pattern at issue. Euclidean distance calculation circuit 470 calculates a Euclidean distance between an ideal pattern 436 corresponding to a negative phase shift (i.e., negative $\Delta$) and digital samples 422. The resulting distance corresponds to the following equation and is provided as a comparison output 472:

$$\text{Comparison Value } 472 = \sum_{i=0}^{n-1} (\text{Negative Shifted Sync Pattern } 442_i - \text{Digital Samples } 422_i)^2.$$

Again, n is the number of bits in the sync pattern at issue. In addition, digital samples 422 are provided to a downstream equalization and data processing circuitry.

Comparison value 452, comparison value 462 and comparison value 472 are provided to a comparator circuit 480. Comparator circuit 480 determines whether any of comparison value 452, comparison value 462 and comparison value 472 is less than a threshold value 499; and which of comparison value 452, comparison value 462 and comparison value 472 is the lowest. Where any of comparison value 452, comparison value 462 and comparison value 472 is below a threshold value 499, sync found output 484 is asserted. In some cases, threshold value 499 is programmable. Comparator circuit 480 selects the phase offset corresponding to the comparison value that was the lowest value, and provides the phase offset as a phase selection output 482 to a phase correction circuit 490. Thus, where comparison value 452 is identified as the lowest, the value of phase selection output 482 is positive $\Delta$. Where comparison value 462 is identified as the lowest, the value of phase selection output 482 is 0. Where comparison value 472 is identified as the lowest, the value of phase selection output 482 is negative $\Delta$. Phase correction circuit 490 modifies sampling clock 492 to incorporate the received phase offset and thereby correct the sampling phase of analog to digital converter circuit 420. In addition, the phase information obtained from the sync mark detection block can also be used to help a downstream detector circuit (e.g., a Viterbi algorithm detector circuit) to adjust the phase in the detection of data.

Ideal pattern 432, ideal pattern 434 and ideal pattern 436 are provided from an ideal sync pattern look up table 430 that provides the aforementioned ideal patterns based on a channel bit density (CBD) input 428. CBD input 428 is calculated or otherwise determined based upon the characteristics of the channel by which analog input 408 is provided. As an example, CBD input 428 may corresponds to the density of data retrieved from a storage medium or received via a transmission medium. Ideal sync pattern look up table 430 includes values that are developed by computing a bit response ($h_b[n]$) of a channel from which analog input 408 is received is computed for an assumed shape (e.g., erf( ) or tanh( )) on a channel step response ($h_s[n]$), and modifying the result by an estimated gain parameter (A). This results in the following model output:

$$\hat{x}[n] = \Sigma a[k] h_b[n-k],$$

where $h_b[n] = h_s[n] - h_s[n-1]$, and $$h_s[n] = A \cdot \text{erf}\left(2\sqrt{\ln 2}\, \frac{n}{CBD \text{ input } 428}\right).$$

For each of ideal pattern 432, ideal pattern 434 and ideal pattern 436 a different value of n is used. In particular, for ideal pattern 432 the value of n is offset by positive $\Delta$, for ideal pattern 434 the value of n is not offset, and for ideal pattern 436 the value of n is offset by negative $\Delta$.

It should be noted that in some cases, ideal sync pattern look up table 430 provides the aforementioned ideal patterns based on channel bit density (CBD) input 428, a value of corner frequencies and amplification in analog front end circuit 410. In such a case, ideal sync pattern look up table 430 includes values that are developed by computing a bit response ($h_b[n]$) of a channel from which analog input 408 is received is computed for an assumed shape (e.g., erf( ) or tanh( )) on a channel step response ($h_s[n]$), and modifying the result by an estimated gain parameter (A). Based on the knowledge of the lower and upper corner frequencies, and the amplification applied by analog front end circuit 410 an impulse response of the analog front end circuit is constructed. A polynomial model for channel bit response $h_b[n]$ parameterized by CBD input 428 and a polynomial model for analog front end circuit response parameterized by the amplification and corner frequencies. This results in the following model output:

$$\hat{x}[n] = \Sigma a[k] \tilde{h}_b[n-k],$$

where $$\tilde{h}_b[n] = \sum_k h_b[n-k]f[k]$$

is the filtered channel bit response, f[k] is the impulse response of analog front end circuit 410, $h_b[n]=h_s[n]-h_s[n-1]$, and $$h_s[n] = A \cdot \text{erf}\left(2\sqrt{\ln 2} \; \frac{n}{CBD \text{ input } 428}\right).$$

For each of ideal pattern 432, ideal pattern 434 and ideal pattern 436 a different value of n is used. In particular, for ideal pattern 432 the value of n is offset by positive Δ, for ideal pattern 434 the value of n is not offset, and for ideal pattern 436 the value of n is offset by negative Δ.

Of note, data samples generated prior to equalization are used for data sync detection processes. Such an approach avoids a situation where taps or coefficients of a downstream equalizer are sufficiently out of tune that a sync mark cannot be detected in the post equalization data resulting in a deadlock condition where a sync mark cannot be found and thereby the equalizer taps or coefficients cannot be trained. Based upon the disclosure provided herein, one of ordinary skill in the art will recognize a variety of other advantages that may be achieved through use of one or more embodiments of the present invention.

Figure 5:
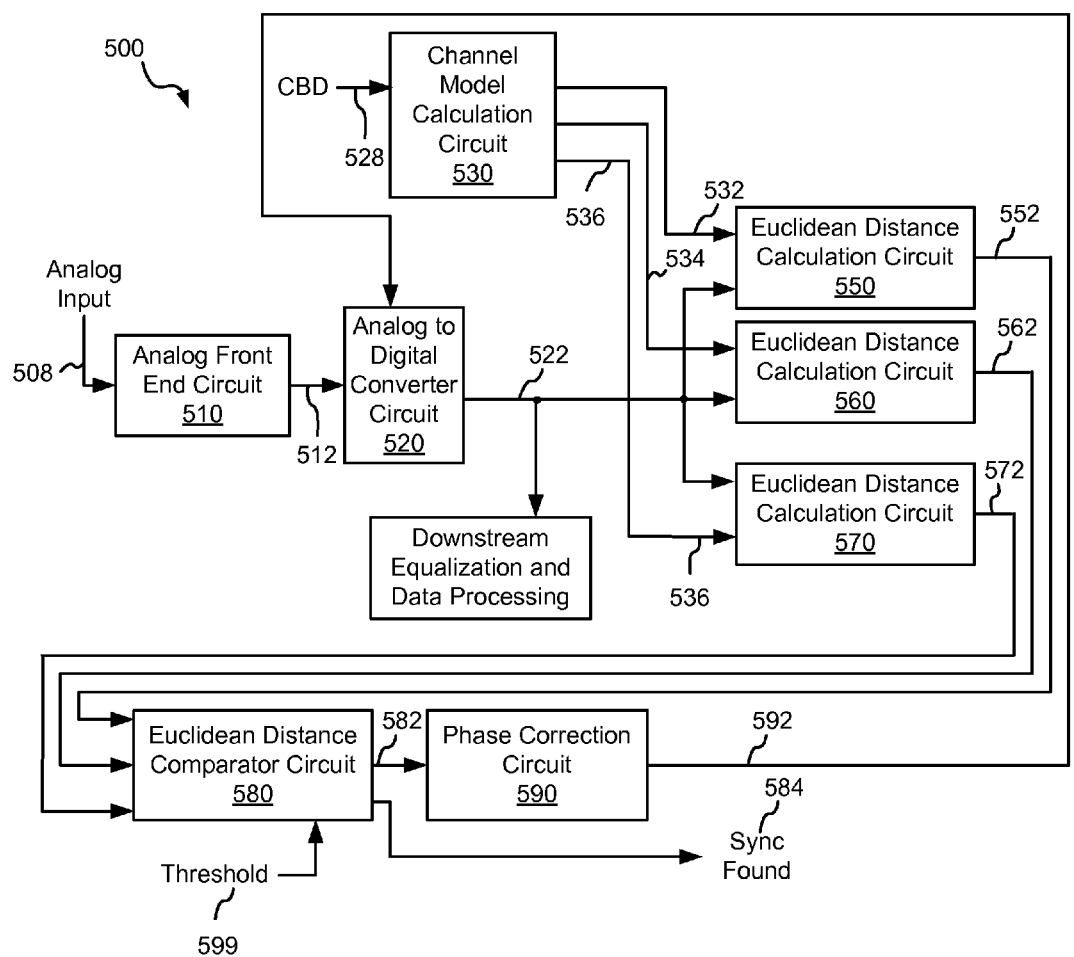
FIG. 5 shows a data processing circuit including yet another pre-equalizer sync mark detector circuit in accordance with some embodiments of the present invention.

Turning to FIG. 5, a data processing circuit 500 is shown that includes another pre-equalizer sync mark detector circuit in accordance with other embodiments of the present invention. Data processing circuit 500 includes an analog front end circuit 510 that receives an analog input 508. Analog input 508 may be received, for example, from a read/write head assembly (not shown) disposed in relation to a storage medium (not shown). As another example, analog input 508 may be received from a transmission medium (not shown) via a receiver (not shown). Based upon the disclosure provided herein, one of ordinary skill in the art will recognize a variety of sources of analog input 508. Analog front end circuit 510 processes analog signal 508 and provides a processed analog signal 512 to an analog to digital converter circuit 520. Analog front end circuit 510 may include, but is not limited to, an analog filter and an amplifier circuit as are known in the art. Based upon the disclosure provided herein, one of ordinary skill in the art will recognize a variety of circuitry that may be included as part of analog front end circuit 510.

Analog to digital converter circuit 520 converts processed analog signal 512 into a corresponding series of digital samples 522. Analog to digital converter circuit 520 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In addition to being used for sync mark detection, digital samples 522 are provided to a downstream equalization and data processing circuitry. Such downstream data processing circuitry may rely on a sync found output 584.

Such downstream equalization may include, for example, equalizing the series of digital samples provided from the analog to digital conversion process to yield an equalized data set. Such equalization may be done using, for example, using a finite impulse response circuit as are known in the art. The downstream data processing may include performing data processing on the equalized data set including, for example, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

Digital samples 522 are provided to a Euclidean distance calculation circuit 550, a Euclidean distance calculation circuit 560, and a Euclidean distance calculation circuit 570. Euclidean distance calculation circuit 550 calculates a Euclidean distance between an ideal pattern 532 corresponding to a positive phase shift (i.e., positive Δ) and digital samples 522. The resulting distance corresponds to the following equation and is provided as a comparison output 552:

$$\text{Comparison Value } 552 = \sum_{i=0}^{n-1} (\text{Zero Shifted Sync Pattern } 534_i - \text{Digital Samples } 522_i)^2,$$

where n is the number of bits in the sync pattern at issue. Euclidean distance calculation circuit 560 calculates a Euclidean distance between an ideal pattern 534 corresponding to a zero phase shift and digital samples 522. The resulting distance corresponds to the following equation and is provided as a comparison output 562:

$$\text{Comparison Value } 562 = \sum_{i=0}^{n-1} (\text{Negative Shifted Sync Pattern } 536_i - \text{Digital Samples } 522_i)^2.$$

Again, n is the number of bits in the sync pattern at issue. Euclidean distance calculation circuit 570 calculates a Euclidean distance between an ideal pattern 536 corresponding to a negative phase shift (i.e., negative Δ) and digital samples 522. The resulting distance corresponds to the following equation and is provided as a comparison output 572:

Comparison Value 572 =

$$\sum_{i=0}^{n-1} (\text{Positive Shifted Sync Pattern 536}_i - \text{Digital Samples 522}_i)^2.$$

Again, n is the number of bits in the sync pattern at issue. In addition, digital samples 522 are provided to a downstream equalization and data processing circuitry.

Comparison value 552, comparison value 562 and comparison value 572 are provided to a comparator circuit 580. Comparator circuit 580 determines whether any of comparison value 552, comparison value 562 and comparison value 572 is less than a threshold value 599; and which of comparison value 552, comparison value 562 and comparison value 572 is the lowest. Where any of comparison value 552, comparison value 562 and comparison value 572 is below a threshold value 599, sync found output 584 is asserted. In some cases, threshold value 599 is programmable. Comparator circuit 580 selects the phase offset corresponding to the comparison value that was the lowest value, and provides the phase offset as a phase selection output 582 to a phase correction circuit 590. Thus, where comparison value 552 is identified as the lowest, the value of phase selection output 582 is positive Δ. Where comparison value 562 is identified as the lowest, the value of phase selection output 582 is 0. Where comparison value 572 is identified as the lowest, the value of phase selection output 582 is negative Δ. Phase correction circuit 590 modifies sampling clock 592 to incorporate the received phase offset and thereby correct the sampling phase of analog to digital converter circuit 520.

Ideal pattern 532, ideal pattern 534 and ideal pattern 536 are provided from a channel model calculation circuit 530 that performs an on the fly calculation that provides the aforementioned ideal patterns based on a channel bit density (CBD) input 528. CBD input 528 is calculated or otherwise determined based upon the characteristics of the channel by which analog input 508 is provided. As an example, CBD input 528 may corresponds to the density of data retrieved from a storage medium or received via a transmission medium. Channel model calculation circuit 530 produces values that are developed by computing a bit response ($h_b[n]$) of a channel from which analog input 508 is received is computed for an assumed shape (e.g., erf( ) or tanh( )) on a channel step response ($h_s[n]$), and modifying the result by an estimated gain parameter (A). This results in the following model output:

$$\hat{x}[n] = \Sigma a[k] h_b[n-k],$$

where $h_b[n] = h_s[n] - h_s[n-1]$, and $$h_s[n] = A \cdot \text{erf}\left(2\sqrt{\ln 2}\, \frac{n}{\text{CBD input 528}}\right).$$

For each of ideal pattern 532, ideal pattern 534 and ideal pattern 536 a different value of n is used. In particular, for ideal pattern 532 the value of n is offset by positive Δ, for ideal pattern 534 the value of n is not offset, and for ideal pattern 536 the value of n is offset by negative Δ.

Again, data samples generated prior to equalization are used for data sync detection processes. Such an approach avoids a situation where taps or coefficients of a downstream equalizer are sufficiently out of tune that a sync mark cannot be detected in the post equalization data resulting in a deadlock condition where a sync mark cannot be found and thereby the equalizer taps or coefficients cannot be trained. Based upon the disclosure provided herein, one of ordinary skill in the art will recognize a variety of other advantages that may be achieved through use of one or more embodiments of the present invention.

Figure 6:
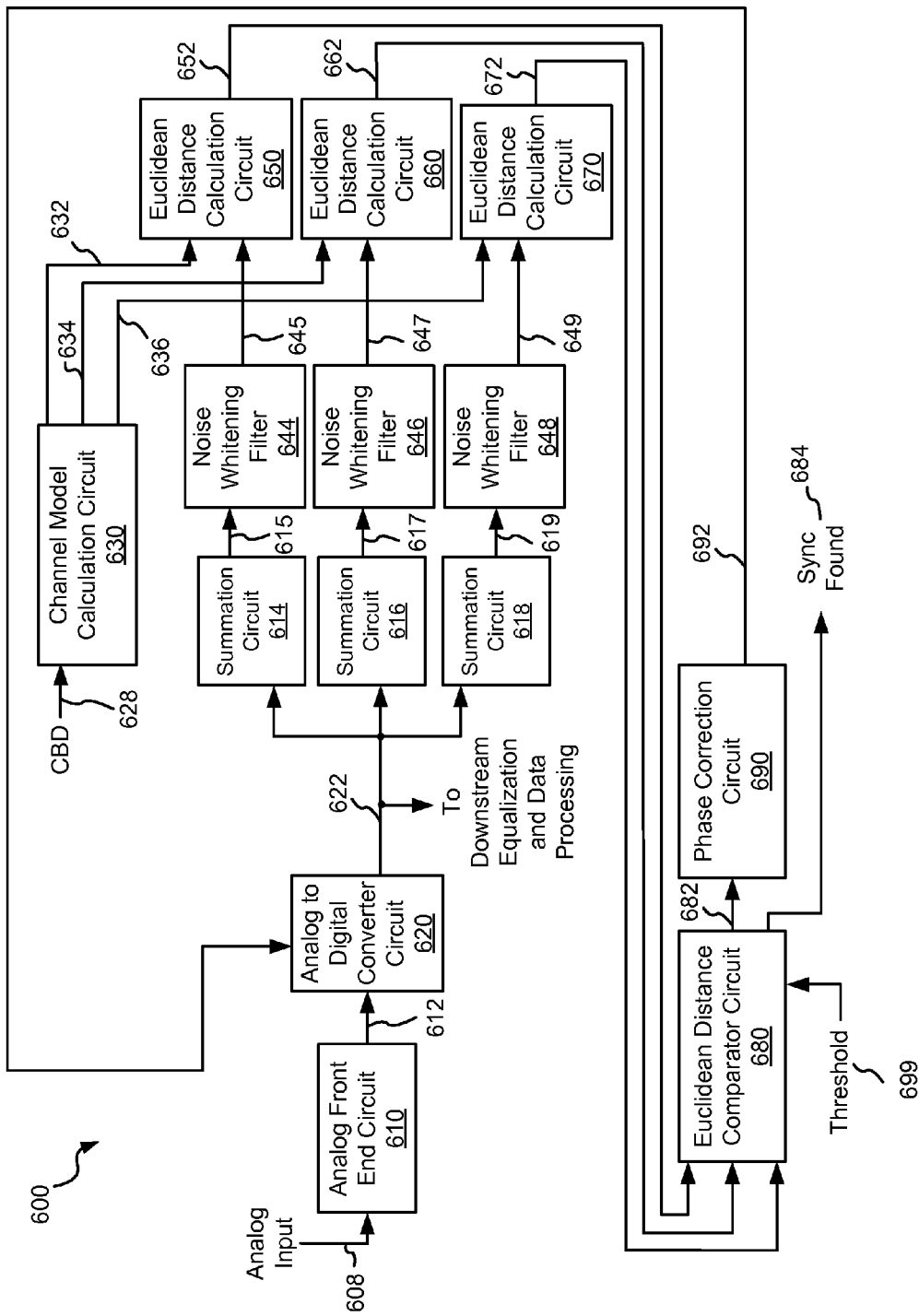
FIG. 6 depicts a data processing circuit including a pre-equalizer sync mark detector circuit using noise whitening in accordance with various embodiments of the present invention.

Turning to FIG. 6, a data processing circuit 600 is shown that includes a pre-equalizer sync mark detector circuit using noise whitening in accordance with various embodiments of the present invention. Data processing circuit 600 includes an analog front end circuit 610 that receives an analog input 608. Analog input 608 may be received, for example, from a read/write head assembly (not shown) disposed in relation to a storage medium (not shown). As another example, analog input 608 may be received from a transmission medium (not shown) via a receiver (not shown). Based upon the disclosure provided herein, one of ordinary skill in the art will recognize a variety of sources of analog input 608. Analog front end circuit 610 processes analog signal 608 and provides a processed analog signal 612 to an analog to digital converter circuit 620. Analog front end circuit 610 may include, but is not limited to, an analog filter and an amplifier circuit as are known in the art. Based upon the disclosure provided herein, one of ordinary skill in the art will recognize a variety of circuitry that may be included as part of analog front end circuit 610.

Analog to digital converter circuit 620 converts processed analog signal 612 into a corresponding series of digital samples 622. Analog to digital converter circuit 620 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In addition to being used for sync mark detection, digital samples 622 are provided to a downstream equalization and data processing circuitry. Such downstream data processing circuitry may rely on a sync found output 684.

Such downstream equalization may include, for example, equalizing the series of digital samples provided from the analog to digital conversion process to yield an equalized data set. Such equalization may be done using, for example, using a finite impulse response circuit as are known in the art. The downstream data processing may include performing data processing on the equalized data set including, for example, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

An ideal pattern 632, an ideal pattern 634 and an ideal pattern 636 are provided from a channel model calculation circuit 630 that performs an on the fly calculation. Ideal pattern 632 corresponds to a positive phase shift (i.e., positive Δ), ideal pattern 634 corresponds to a zero shift, and ideal pattern 636 corresponds to a negative shift (i.e., negative Δ). The aforementioned ideal patterns are calculated based on, for example, a channel bit density (CBD) input 628. CBD input 628 is calculated or otherwise determined based upon the characteristics of the channel by which analog input 608 is provided. As an example, CBD input 628 may corresponds to the density of data retrieved from a storage medium or received via a transmission medium. Channel model calculation circuit 630 produces values that are developed by computing a bit response ($h_b[n]$) of a channel from which analog input 608 is received is computed for an assumed shape (e.g., erf( ) or tanh( )) on a channel step response ($h_s[n]$), and modifying the result by an estimated gain parameter (A). This results in the following model output:

$$\hat{x}[n] = \Sigma a[k]\tilde{h}_b[n-k],$$

where $$\tilde{h}_b[n] = \sum_k h_b[n-k]f[k]$$

is the filtered channel bit response, f[k] is the impulse response of analog front end circuit 410, $h_b[n]=h_s[n]-h_s[n-1]$, and $$h_s[n] = A \cdot \text{erf}\left(2\sqrt{\ln 2}\, \frac{n}{CBD \text{ input } 628}\right).$$

For each of ideal pattern 632, ideal pattern 634 and ideal pattern 636 a different value of n is used. In particular, for ideal pattern 632 the value of n is offset by positive Δ, for ideal pattern 634 the value of n is not offset, and for ideal pattern 636 the value of n is offset by negative Δ.

Digital samples 622 are provided to a summation circuit 614, a summation circuit 616 and a summation circuit 618. In addition, digital samples 622 are provided to a downstream equalization and data processing circuitry. Summation circuit 614 combines digital samples 622 with ideal pattern 632 to yield a summed output 615; summation circuit 616 combines digital samples 622 with ideal pattern 634 to yield a summed output 617; and summation circuit 618 combines digital samples 622 with ideal pattern 636 to yield a summed output 619.

Summed output 615 is provided to a noise whitening filter 644; summed output 617 is provided to a noise whitening filter 646; and summed output 619 is provided to a noise whitening filter 648. Each of the aforementioned noise whitening filters use a combination of one or more of channel bit density (CBD), analog front end circuit characteristics including corner frequencies and amplification, noise predictors and the expected sync mark to perform noise whitening on the respective inputs. As a particular example, an error at the optimum sync mark location is modeled in accordance with the following equation:

$$e[n] = \sum_k b[k]\tau[k]\tilde{h}_i[n-k] + v[n],$$

where $\tilde{h}_i[n] = \sum_k h_i[n-k]f[k]$ is the channel impulse response as filtered by analog front end circuit 610, v[n] is the electronics noise, the channel impulse response is $$h_i[n] = A \cdot \frac{4\ln 2}{(CBD \text{ input } 628)\sqrt{\pi}} \cdot \exp\left(-4\ln 2 \frac{n^2}{(CBD \text{ input } 628)^2}\right),$$

b[n]=a[n]−a[n−1]] is a transition sequence, and τ[n] is transition jitter. In the presence of jitter noise, correlation of the error sequence can be determined as follows:

$$\phi_e[m] = \sigma_\tau^2 \sum_k b^2[k]\tilde{h}_i[n-k]\tilde{h}_i[n-m-k] + P_v \sum_k f[k]f[k-m],$$

where $\sigma_\tau^2$ is jitter variance, $P_v$ is electronics noise power at the input of analog front end circuit 610. From the aforementioned the following equation can be derived:

$$\rho[m] = \frac{\phi_e[m]}{P_{tot}} =$$

$$\frac{\eta}{2 \cdot E_i}\sigma_\tau^2 \sum_k b^2[k]\tilde{h}_i[n-k]\tilde{h}_i[n-m-k] + (1-\eta)\sum_k f[k]f[k-m],$$

Since $\eta P_{tot} = 2\sigma_\tau^2 E_i$, where $$E_i = \sum_k h_i[k]h_i[k],$$

$P_{tot}$ is the total noise power at the output of analog front end circuit 610, and η is the percentage of jitter noise at the input of analog front end circuit 610.

Based on the information on percentage of jitter noise at the input of analog front end circuit 610, channel bit density, operation of analog front end circuit 610 including corner frequencies and amplification, and the ideal sync mark pattern, each of noise whitening filters 644, 646, 648 can be designed to include a noise whitener to whiten the error sequence $e[n, n_0]$ at the output of analog to digital converter circuit 620. The following matrix describes an exemplary third order noise predictor that may be used in relation to each of noise whitening filters 644, 646, 648:

$$\begin{bmatrix} p_1 \\ p_2 \\ p_3 \end{bmatrix} = \begin{bmatrix} \tilde{\rho}[0] & \tilde{\rho}[1] & \tilde{\rho}[2] \\ \tilde{\rho}[1] & \tilde{\rho}[0] & \tilde{\rho}[1] \\ \tilde{\rho}[2] & \tilde{\rho}[1] & \tilde{\rho}[0] \end{bmatrix} \begin{bmatrix} \tilde{\rho}[0] \\ \tilde{\rho}[2] \\ \tilde{\rho}[3] \end{bmatrix}, \text{ with}$$

$$\tilde{\rho}[m] = E_i \rho[m] =$$

$$\frac{\eta}{2}\sigma_\tau^2 \sum_k b^2[k]\tilde{h}_i[n-k]\tilde{h}_i[n-m-k] + (1-\eta)E_i \sum_k f[k]f[k-m].$$

Noise whitening filter 644 provides a noise whitened output 645 to a Euclidean distance calculation circuit 650; noise whitened filter 646 provides a noise whitened output 647 to a Euclidean distance calculation circuit 660; and noise whitened filter 648 provides a noise whitened output 649 to a Euclidean distance calculation circuit 670. Euclidean distance calculation circuit 650 calculates a Euclidean distance between an ideal pattern 632 corresponding to a positive phase shift (i.e., positive Δ) and noise whitened output 645. The resulting distance corresponds to the following equation and is provided as a comparison output 652:

$$\text{Comparison Value } 652 = \sum_{i=0}^{n-1} (\text{Positive Shifted Sync Pattern } 632_i -$$

$$\text{Noise Whitented Output } 645_i)^2,$$

where n is the number of bits in the sync pattern at issue. Euclidean distance calculation circuit 660 calculates a Euclidean distance between an ideal pattern 634 corresponding to a zero phase shift and noise whitened output 647. The resulting distance corresponds to the following equation and is provided as a comparison output 662:

$$\text{Comparison Value 662} = \sum_{i=0}^{n-1} (\text{Zero Shifted Sync Pattern } 634_i - \text{Noise Whitened Output } 647_i)^2.$$

Again, n is the number of bits in the sync pattern at issue. Euclidean distance calculation circuit 670 calculates a Euclidean distance between an ideal pattern 636 corresponding to a negative phase shift (i.e., negative Δ) and noise whitened output 649. The resulting distance corresponds to the following equation and is provided as a comparison output 672:

$$\text{Comparison Value 672} = \sum_{i=0}^{n-1} (\text{Negative Shifted Sync Pattern } 636_i - \text{Noise Whitened Output } 649_i)^2.$$

Again, n is the number of bits in the sync pattern at issue.

Comparison value 652, comparison value 662 and comparison value 672 are provided to a comparator circuit 680. Comparator circuit 680 determines whether any of comparison value 652, comparison value 662 and comparison value 672 is less than a threshold value 699; and which of comparison value 652, comparison value 662 and comparison value 672 is the lowest. Where any of comparison value 652, comparison value 662 and comparison value 672 is below a threshold value 699, sync found output 684 is asserted. In some cases, threshold value 699 is programmable. Comparator circuit 680 selects the phase offset corresponding to the comparison value that was the lowest value, and provides the phase offset as a phase selection output 682 to a phase correction circuit 690. Thus, where comparison value 652 is identified as the lowest, the value of phase selection output 682 is positive Δ. Where comparison value 662 is identified as the lowest, the value of phase selection output 682 is 0. Where comparison value 672 is identified as the lowest, the value of phase selection output 682 is negative Δ. Phase correction circuit 690 modifies sampling clock 692 to incorporate the received phase offset and thereby correct the sampling phase of analog to digital converter circuit 620.

Again, data samples generated prior to equalization are used for data sync detection processes. Such an approach avoids a situation where taps or coefficients of a downstream equalizer are sufficiently out of tune that a sync mark cannot be detected in the post equalization data resulting in a deadlock condition where a sync mark cannot be found and thereby the equalizer taps or coefficients cannot be trained. Based upon the disclosure provided herein, one of ordinary skill in the art will recognize a variety of other advantages that may be achieved through use of one or more embodiments of the present invention.

Figure 7:
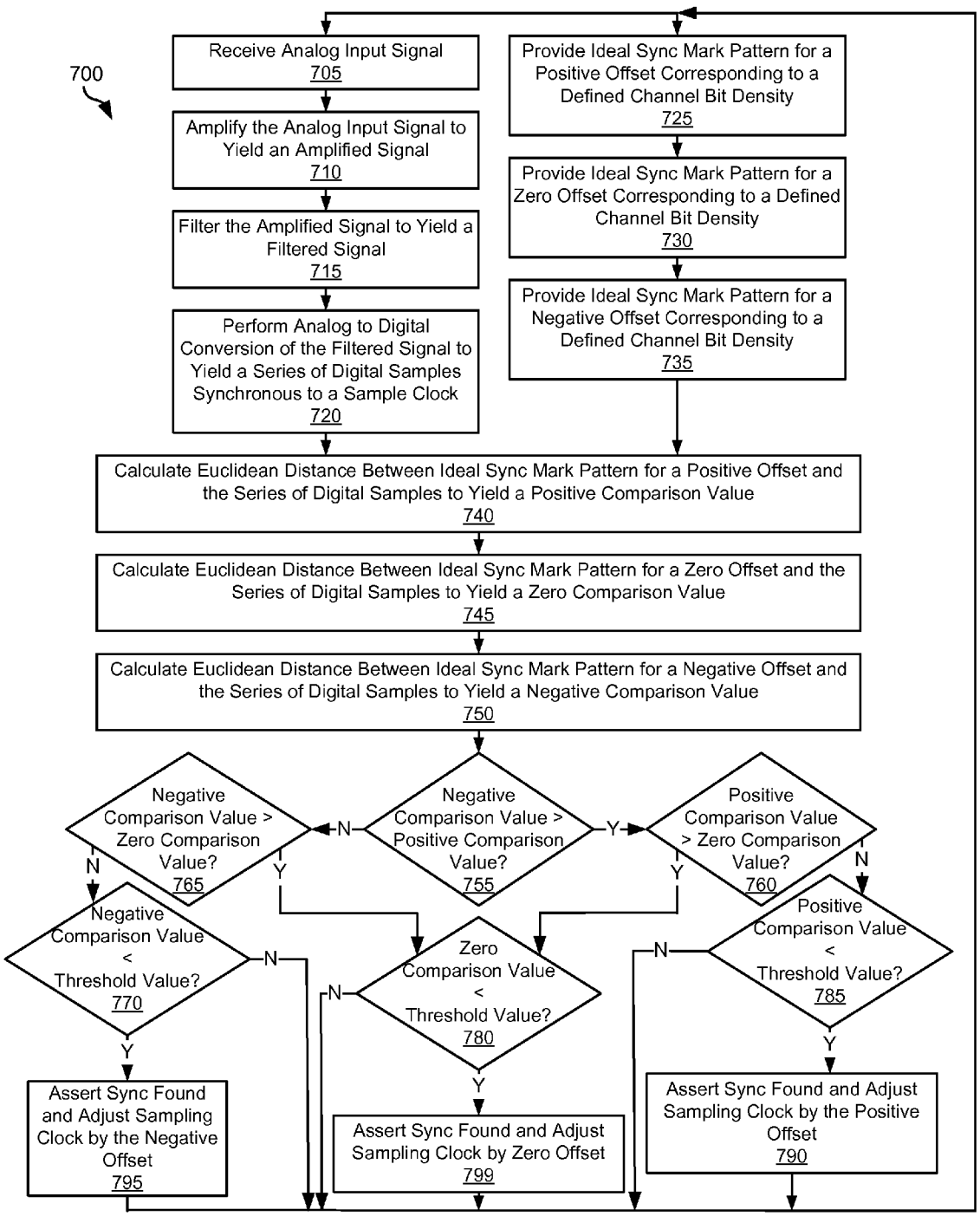
FIG. 7 is a flow diagram showing a method in accordance with some embodiments of the present invention for performing pre-equalizer sync mark detection.

Turning to FIG. 7, a flow diagram 700 shows a method in accordance with some embodiments of the present invention for performing pre-equalizer sync mark detection. Following flow diagram 700, an analog input signal is received (block 705). Analog input signal includes various information including one or more sync marks that are to be detected. Analog input signal may be received, for example, from a read/write head assembly that senses information from a storage medium or from a receiver that receives information from a transmission medium. Based upon the disclosure provided herein, one of ordinary skill in the art will recognize a variety of sources of the analog input signal. The analog input signal is amplified to yield an amplified signal (block 710), and the amplified signal is filtered to yield a filtered signal (block 715). The aforementioned amplification and filtering may be done in either order, and may be done by an analog front end circuit as are known in the art. An analog to digital conversion process is applied to the filtered output to yield a series of corresponding digital samples (block 720). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention.

In parallel, an ideal sync mark pattern is provided that corresponds to a positive offset from the sampling clock (block 725). The ideal sync mark pattern is determined based at least in part upon channel bit density (i.e., the density of the channel from which the analog input signal is derived). In one particular case, the ideal sync pattern is developed by computing a bit response ($h_b[n]$) of a channel from which the analog input signal is received is computed for an assumed shape (e.g., erf( ) or tanh( )) on a channel step response ($h_s[n]$), and modifying the result by an estimated gain parameter (A). This results in the following model output:

$$\hat{x}[n] = \Sigma a[k] h_b[n-k],$$

where $h_b[n] = h_s[n] - h_s[n-1]$, and $$h_s[n] = A \cdot \text{erf}\left(2\sqrt{\ln 2} \frac{n}{\text{Channel Bit Density}}\right).$$

This ideal sync mark pattern may be calculated on the fly based upon channel bit density, or may be pre-computed and stored to a memory and then pulled from the memory during operation.

Similarly, an ideal sync mark pattern is provided that corresponds to a zero offset from the sampling clock (block 730). This ideal sync mark may be calculated similar to that discussed above in relation to the ideal sync mark pattern corresponding to a positive offset. Again, this ideal sync mark pattern may be calculated on the fly based upon channel bit density, or may be pre-computed and stored to a memory and then pulled from the memory during operation. In addition, an ideal sync mark pattern is provided that corresponds to a negative offset from the sampling clock (block 735). This ideal sync mark may be calculated similar to that discussed above in relation to the ideal sync mark pattern corresponding to a positive offset, and may be calculated on the fly based upon channel bit density, or may be pre-computed and stored to a memory and then pulled from the memory during operation.

A Euclidean distance between the ideal sync mark pattern corresponding to the positive offset and the digital samples is calculated to yield a positive comparison value (block 740).

This calculation may be performed in accordance with the following equation:

$$\text{Positive Comparion Value} = \sum_{i=0}^{n-1}(\text{Positive Offset Sync Mark Pattern}_i - \text{Digital Samples}_i)^2,$$

where n is the number of bits in the sync pattern at issue. Similarly, a Euclidean distance between the ideal sync mark pattern corresponding to the zero offset and the digital samples is calculated to yield a zero comparison value (block 745). This calculation may be performed in accordance with the following equation:

$$\text{Zero Comparison Value} = \sum_{i=0}^{n-1}(\text{Zero Offset Sync Mark Pattern}_i - \text{Digital Samples}_i)^2.$$

Again, n is the number of bits in the sync pattern at issue. Similarly, a Euclidean distance between the ideal sync mark pattern corresponding to the negative offset and the digital samples is calculated to yield a negative comparison value (block 750). This calculation may be performed in accordance with the following equation:

$$\text{Negative Comparison Value} = \sum_{i=0}^{n-1}(\text{Negative Offset Sync Mark Pattern}_i - \text{Digital Samples}_i)^2.$$

Again, n is the number of bits in the sync pattern at issue.

It is determined whether the negative comparison value is greater than the positive comparison value (block 755). Where the negative comparison value is less than or equal to the positive comparison value (block 755), it is determined whether the negative comparison value is greater than the zero comparison value (block 765). Where the negative comparison value is less than or equal to the zero comparison value (block 765), it is determined whether the negative comparison value is less than a threshold value (block 770). The threshold value may be either fixed or programmable and represents a level at which a sync mark found will be indicated. Thus, where the negative comparison value is less than the threshold value (block 770), a sync mark found signal is asserted and the sampling clock is adjusted by the negative offset (block 795). As such, the sampling phase of the analog to digital conversion process is adjusted to match the phase that yielded the closest location of the sync mark pattern in the digital samples.

Alternatively, where the negative comparison value is greater than the positive comparison value (block 755), it is determined whether the positive comparison value is greater than the zero comparison value (block 760). Where the positive comparison value is less than or equal to the zero comparison value (block 760), it is determined whether the positive comparison value is less than the threshold value (block 785). Again, the threshold value may be either fixed or programmable and represents a level at which a sync mark found will be indicated. Thus, where the positive comparison value is less than the threshold value (block 785), the sync mark found signal is asserted and the sampling clock is adjusted by the positive offset (block 790). As such, the sampling phase of the analog to digital conversion process is adjusted to match the phase that yielded the closest location of the sync mark pattern in the digital samples.

Alternatively, where either the positive comparison value is greater than the zero comparison value (block 760) or the negative comparison value is greater than the zero comparison value (765), it is determined whether the zero comparison value is less than the threshold value (block 780). Again, the threshold value may be either fixed or programmable and represents a level at which a sync mark found will be indicated. Thus, where the zero comparison value is less than the threshold value (block 780), the sync mark found signal is asserted and the sampling clock is adjusted by the zero offset (i.e., is left unmodified) (block 799). As such, the sampling phase of the analog to digital conversion process is adjusted to match the phase that yielded the closest location of the sync mark pattern in the digital samples.

Of note, the resulting detected sync mark may be used to control the timing of downstream data processing. Such downstream data processing may include, for example, equalizing the series of digital samples provided from the analog to digital conversion process to yield an equalized data set, and performing a data processing on the equalized data set. Such equalization may be done using, for example, using a finite impulse response circuit as are known in the art. The data processing on the equalized data set may include, but is not limited to, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

Figure 8:
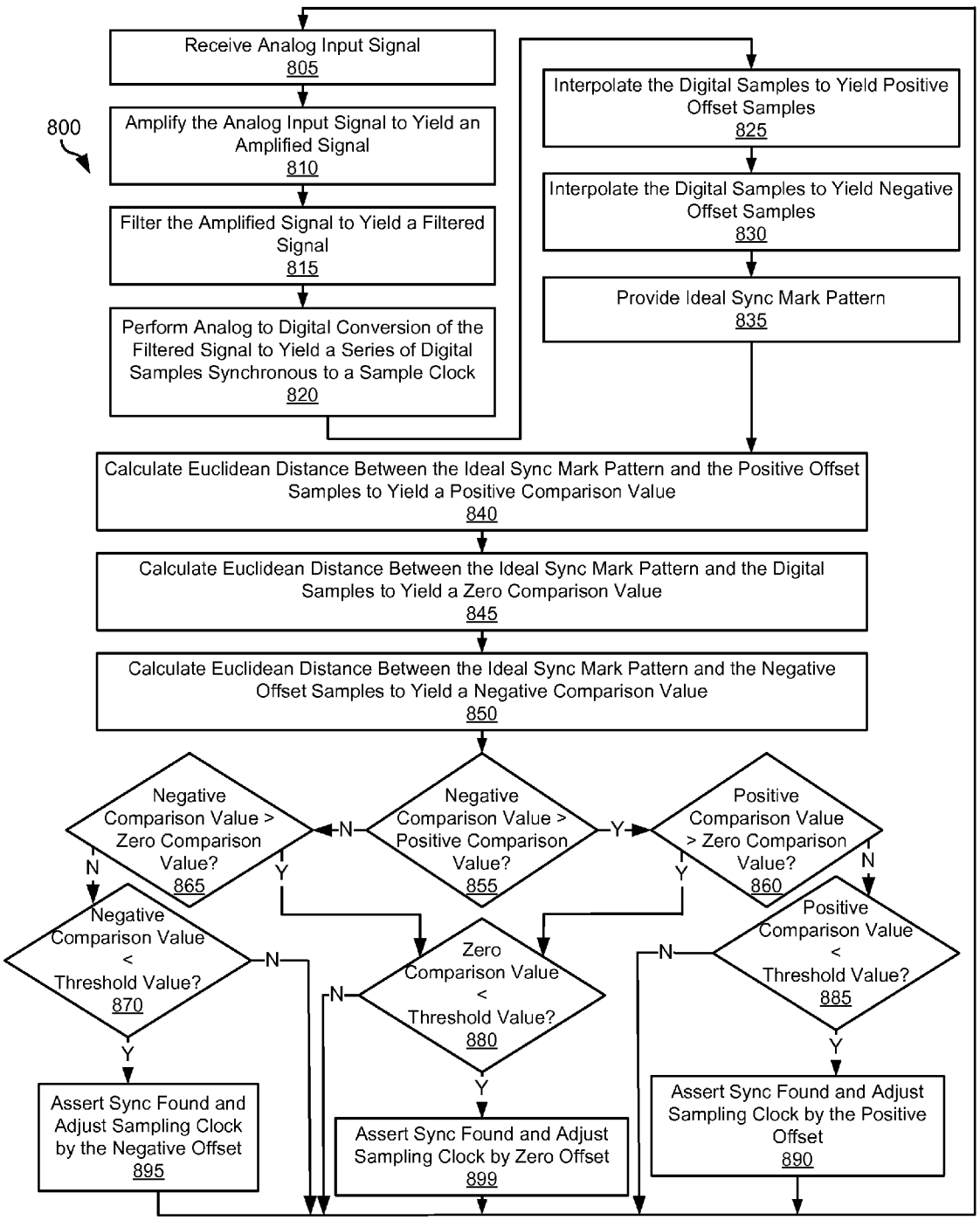
FIG. 8 is a flow diagram showing another method in accordance with various embodiments of the present invention for performing pre-equalizer sync mark detection.

Turning to FIG. 8, a flow diagram 800 shows another method in accordance with various embodiments of the present invention for performing pre-equalizer sync mark detection. Following flow diagram 800, an analog input signal is received (block 805). Analog input signal includes various information including one or more sync marks that are to be detected. Analog input signal may be received, for example, from a read/write head assembly that senses information from a storage medium or from a receiver that receives information from a transmission medium. Based upon the disclosure provided herein, one of ordinary skill in the art will recognize a variety of sources of the analog input signal. The analog input signal is amplified to yield an amplified signal (block 810), and the amplified signal is filtered to yield a filtered signal (block 815). The aforementioned amplification and filtering may be done in either order, and may be done by an analog front end circuit as are known in the art. An analog to digital conversion process is applied to the filtered output to yield a series of corresponding digital samples (block 820). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention.

The digital samples are interpolated by a positive phase offset to yield positive offset samples that would have been expected where the sampling clock used in creating the digital samples was adjusted forward by the positive phase offset (block 825). In addition, the digital samples are interpolated by a negative phase offset to yield negative offset samples that would have been expected where the sampling clock used in creating the digital samples was adjusted backward by the negative phase offset (block 830). An ideal sync mark pattern (i.e., a sync mark pattern corresponding to a correctly sampled analog input signal) is provided (block 835). The ideal sync mark pattern may be calculated based upon knowledge of what the pattern is along with the response of the channel through which the analog input signal is received.

A Euclidean distance between the ideal sync mark pattern and the positive offset samples to yield a positive comparison value (block 840). This calculation may be performed in accordance with the following equation:

$$\text{Positive Comparison Value} = \sum_{i=0}^{n-1} (\text{Ideal Sync Mark Pattern}_i - \text{Positive Samples}_i)^2,$$

where n is the number of bits in the sync pattern at issue. Similarly, a Euclidean distance between the ideal sync mark pattern and the digital samples is calculated to yield a zero comparison value (block 845). This calculation may be performed in accordance with the following equation:

$$\text{Zero Comparison Value} = \sum_{i=0}^{n-1} (\text{Ideal Sync Mark Pattern}_i - \text{Digital Samples}_i)^2.$$

Again, n is the number of bits in the sync pattern at issue. Similarly, a Euclidean distance between the ideal sync mark pattern and the negative samples is calculated to yield a negative comparison value (block 850). This calculation may be performed in accordance with the following equation:

$$\text{Negative Comparison Value} = \sum_{i=0}^{n-1} (\text{Ideal Sync Mark Pattern}_i - \text{Negative Samples}_i)^2.$$

Again, n is the number of bits in the sync pattern at issue.

It is determined whether the negative comparison value is greater than the positive comparison value (block 855). Where the negative comparison value is less than or equal to the positive comparison value (block 855), it is determined whether the negative comparison value is greater than the zero comparison value (block 865). Where the negative comparison value is less than or equal to the zero comparison value (block 865), it is determined whether the negative comparison value is less than a threshold value (block 870). The threshold value may be either fixed or programmable and represents a level at which a sync mark found will be indicated. Thus, where the negative comparison value is less than the threshold value (block 870), a sync mark found signal is asserted and the sampling clock is adjusted by the negative offset (block 895). As such, the sampling phase of the analog to digital conversion process is adjusted to match the phase that yielded the closest location of the sync mark pattern in the digital samples.

Alternatively, where the negative comparison value is greater than the positive comparison value (block 855), it is determined whether the positive comparison value is greater than the zero comparison value (block 860). Where the positive comparison value is less than or equal to the zero comparison value (block 860), it is determined whether the positive comparison value is less than the threshold value (block 885). Again, the threshold value may be either fixed or programmable and represents a level at which a sync mark found will be indicated. Thus, where the positive comparison value is less than the threshold value (block 885), the sync mark found signal is asserted and the sampling clock is adjusted by the positive offset (block 890). As such, the sampling phase of the analog to digital conversion process is adjusted to match the phase that yielded the closest location of the sync mark pattern in the digital samples.

Alternatively, where either the positive comparison value is greater than the zero comparison value (block 860) or the negative comparison value is greater than the zero comparison value (865), it is determined whether the zero comparison value is less than the threshold value (block 880). Again, the threshold value may be either fixed or programmable and represents a level at which a sync mark found will be indicated. Thus, where the zero comparison value is less than the threshold value (block 880), the sync mark found signal is asserted and the sampling clock is adjusted by the zero offset (i.e., is left unmodified) (block 899). As such, the sampling phase of the analog to digital conversion process is adjusted to match the phase that yielded the closest location of the sync mark pattern in the digital samples.

Of note, the resulting detected sync mark may be used to control the timing of downstream data processing. Such downstream data processing may include, for example, equalizing the series of digital samples provided from the analog to digital conversion process to yield an equalized data set, and performing a data processing on the equalized data set. Such equalization may be done using, for example, using a finite impulse response circuit as are known in the art. The data processing on the equalized data set may include, but is not limited to, one or more data detection processes and data decoding processes. Such data detection processes may be, for example, a maximum a posteriori data detection process as is known in the art or a Viterbi algorithm data detection process as is known in the art. Such data decoding processes may be, for example, a low density parity check decoding process as is known in the art.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing data processing and/or updating filter coefficients in a data processing system. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing circuit, the circuit comprising:
   a first comparison circuit operable to compare a first set of digital samples derived from an analog input with a first sync pattern to yield a first comparison value corresponding to a first phase;
   a second comparison circuit operable to compare a second set of digital samples derived from the analog input with a second sync pattern to yield a second comparison value corresponding to a second phase;
   a comparator circuit operable to identify the first comparison value as less than the second comparison value, and to provide the first phase as a phase correction output; and
   an ideal sync pattern circuit operable to provide the first sync pattern corresponding to the first phase and the second sync pattern corresponding to the second phase, wherein the ideal sync pattern circuit includes an ideal sync pattern look up table operable to provide the expected sync pattern at the first phase and the expected sync pattern at the second phase based at least in part on a channel bit density.

2. The data processing circuit of claim 1, wherein the first set of digital samples and the second set of digital samples are the same digital samples, wherein the first sync pattern corresponds to the expected sync pattern at the first phase and the second sync pattern corresponds to the expected sync pattern at the second phase.

3. The data processing circuit of claim 2, wherein the circuit further comprises:
   an analog to digital converter circuit operable to sample the analog input synchronous to a sampling clock; and
   a phase correction circuit operable to adjust the sampling clock based at least in part on the phase correction output.

4. The data processing circuit of claim 3, wherein the circuit further comprises:
   an equalizer circuit operable to equalize the same digital samples to yield an equalized data set; and
   a data detector circuit operable to process the equalized data set.

5. The data processing circuit of claim 1, wherein the first comparison circuit is a first Euclidean distance calculation circuit operable to calculate the first comparison value as the Euclidean distance between the same digital samples and the expected sync pattern at the first phase, and wherein the second comparison circuit is a second Euclidean distance calculation circuit operable to calculate the second comparison value as the Euclidean distance between the same digital samples and the expected sync pattern at the second phase.

6. The data processing circuit of claim 1, wherein the circuit further comprises:
   an analog front end circuit operable to filter a continuous signal to yield the analog input, wherein the analog front end circuit exhibits a corner frequency; and
   wherein the ideal sync pattern lookup table is further operable to provide the expected sync pattern at the first phase and the expected sync pattern at the second phase is based at least in part on the corner frequency.

7. The data processing circuit of claim 1, wherein the circuit further comprises:
   an analog front end circuit operable to amplify a continuous signal to yield the analog input, wherein the analog front end circuit exhibits a gain; and
   wherein the ideal sync pattern lookup table is further operable to provide the expected sync pattern at the first phase and the expected sync pattern at the second phase is based at least in part on the gain.

8. The data processing circuit of claim 1, wherein the comparator circuit is further operable to compare the first comparison value with a threshold value, and to assert a sync found signal when the first comparison value is less than the threshold value.

9. The data processing circuit of claim 1, wherein the data processing circuit is implemented as an integrated circuit.

10. The data processing circuit of claim 1, wherein the data processing circuit is implemented as part of a device selected from a group consisting of: a data storage device, and a data transmission device.

11. The data processing circuit of claim 1, wherein the first sync pattern and the second sync pattern are the same sync pattern, wherein the first set of digital samples is interpolated to represent the analog input at the first phase, and wherein the second set of digital samples is interpolated to represent the analog input at the second phase.

12. The data processing circuit of claim 1, wherein the data processing circuit is implemented as part of a storage device, and wherein the storage device comprises:
    a storage medium maintaining information;
    a read/write head assembly operable to sense the information and to provide a corresponding continuous signal;
    an analog front end circuit operable to process the continuous signal to yield the analog input; and
    an analog to digital converter circuit operable to sample the analog input synchronous to a sampling clock to yield the first set of digital samples and the second set of digital samples.

13. A method for sync mark detection, the method comprising:
    receiving a series of digital samples embodying a sync mark pattern;
    using an ideal sync pattern look up table to generate a first sync pattern corresponding to a first phase based at least in part on a channel bit density;
    using the ideal sync pattern look up table to generate a second sync pattern corresponding to a second phase based at least in part on the channel bit density;
    calculating a difference between the series of digital samples and the first sync pattern to yield a first comparison value corresponding to the first phase;
    calculating a difference between the series of digital samples and the second sync pattern to yield a second comparison value corresponding to the second phase;
    comparing the first comparison value with the second comparison value, wherein the first comparison value is less than the second comparison value; and
    providing the first phase as a phase correction output.

14. The method of claim 13, wherein the method further comprises:
    receiving an analog input signal;
    converting the analog input signal to the series of digital samples synchronous to a sampling clock; and modifying a phase of the sampling clock based at least in part on the phase correction output.

15. The method of claim 14, wherein the method further comprises:
equalizing the series of digital samples to yield an equalized data set; and
performing a data processing on the equalized data set.

16. A data processing system, the system comprising:
a first comparison circuit operable to compare a first set of digital samples derived from an analog input with a first sync pattern to yield a first comparison value corresponding to a first phase;
a second comparison circuit operable to compare a second set of digital samples derived from the analog input with a second sync pattern to yield a second comparison value corresponding to a second phase;
a comparator circuit operable to identify the first comparison value as less than the second comparison value, and to provide the first phase as a phase correction output; and
an ideal sync pattern circuit operable to provide the first sync pattern corresponding to the first phase and the second sync pattern corresponding to the second phase, wherein the ideal sync pattern circuit includes an ideal sync pattern calculation circuit operable to calculate an expected sync pattern at the first phase and an expected sync pattern at the second phase based at least in part on a channel bit density.

17. The system of claim 16, wherein the system further comprises:
an analog front end circuit operable to filter a continuous signal to yield the analog input, wherein the analog front end circuit exhibits a corner frequency; and
wherein the ideal sync pattern calculation circuit is further operable to calculate the expected sync pattern at the first phase and the expected sync pattern at the second phase is based at least in part on the corner frequency.

18. The system of claim 16, the system further comprising:
an analog front end circuit operable to amplify a continuous signal to yield the analog input, wherein the analog front end circuit exhibits a gain; and
wherein the ideal sync pattern calculation circuit is further operable to provide the expected sync pattern at the first phase and the expected sync pattern at the second phase is based at least in part on the gain.

19. The system of claim 16, wherein the comparator circuit is further operable to compare the first comparison value with a threshold value, and to assert a sync found signal when the first comparison value is less than the threshold value.

20. The system of claim 16, wherein the system is implemented as an integrated circuit.

21. The system of claim 16, wherein the system is implemented as part of a storage device, and wherein the storage device comprises:
a storage medium maintaining information;
a read/write head assembly operable to sense the information and to provide a corresponding continuous signal;
an analog front end circuit operable to process the continuous signal to yield the analog input; and
an analog to digital converter circuit operable to sample the analog input synchronous to a sampling clock to yield the first set of digital samples and the second set of digital samples.

22. The system of claim 16, wherein the system is implemented as part of a device selected from a group consisting of: a data storage device, and a data transmission device.

* * * * *